United States Patent [19]

Alsberg

[11] Patent Number: 4,672,572
[45] Date of Patent: Jun. 9, 1987

[54] PROTECTOR SYSTEM FOR COMPUTER ACCESS AND USE

[75] Inventor: Peter Alsberg, Urbana, Ill.

[73] Assignee: Gould Inc., Rolling Meadows, Ill.

[21] Appl. No.: 612,200

[22] Filed: May 21, 1984

[51] Int. Cl.$^4$ .............................................. G06F 7/04
[52] U.S. Cl. .................................................. 364/900
[58] Field of Search ... 364/200 MS File, 900 MS File; 235/380, 382

[56] References Cited

U.S. PATENT DOCUMENTS

| | | | |
|---|---|---|---|
| 3,931,504 | 1/1976 | Jacoby | 364/200 |
| 4,025,760 | 5/1977 | Trenkamp | 235/431 |
| 4,218,738 | 8/1980 | Matyas et al. | 364/200 |
| 4,223,403 | 9/1980 | Konheim et al. | 375/2 |
| 4,234,932 | 11/1980 | Gorgens | 364/900 |
| 4,259,720 | 3/1981 | Campbell | 364/200 |
| 4,264,782 | 4/1981 | Konheim | 364/200 X |
| 4,310,720 | 1/1982 | Check, Jr. | 364/900 X |
| 4,317,957 | 3/1982 | Sendrow | 235/382 X |

Primary Examiner—Thomas M. Heckler
Attorney, Agent, or Firm—Edward E. Sachs; G. Paul Edgell; Robert J. Fox

[57] ABSTRACT

A protector device as described for enhancing the security of a computer system which includes one or more user terminals in one or more host computers. The protector device includes a detection means for monitoring communications between the terminals and the host computers in which the detection means is independent from the host computers in the terminal but is connected to the computers and terminals such that certain information transmitted between the computers and terminals is transmitted through the detection means. The detection means includes additional means for user authentication, access control, command filtering, audit trail recording, audit trail analysis, interrogation, and cryptographic services. The detection means further includes means for generating an alarm in the event that certain potentially sensitive events occur and means for interrogating events generated and stored in the detection means.

4 Claims, 8 Drawing Figures

PROTECTOR SYSTEM FOR COMPUTER ACCESS AND USE

BACKGROUND OF THE INVENTION

The present invention relates generally to protection systems for limiting access to a computer by a user and more specifically to independent protection and monitoring devices for both limiting access by a user to a computer and for auditing potentially sensitive events.

Those involved in communication through computer systems either in a communication network or through simply a plurality of terminals which are connected to a central host computer frequently face the problem of unauthorized access to the computer or to certain data bases, execution programs, or operating systems maintained on a computer or group of computers. One technique of preventing undesirable access is to design software that is demonstrably secure. That is, to design software that can be convincingly demonstrated to prevent access by a user to certain unauthorized levels of information and to allow access to certain authorized levels of information. The problem with this technique is that such software typically requires precise design of system functions and structures so that the resulting software is secure against state-of-the-art threats and can be demonstrated to be secure using state-of-the-art technology such as formal verification/proof technology. In order to add such security to existing software, the architecture of the existing software would have to be significantly redesigned. The resemblance of the resulting secure software designed from the preexisting software would be very slight and would typically destroy compatibility between uses of the existing software and the software which has been made secure.

Another relatively new technique is to provide a password system in the communication line of a computer. Typically, this type of system requires the user to present a password or some other form of identification as the user is logging onto a computer. This password is fed into a user interface device such as a communications modem which is typically a relatively intelligent modem. The interface device looks up the password according to the user's name and telephone number and then calls the user back through a known phone number listed in the password log. Under such a technique, the user is only able to obtain access to the computer through an outgoing call made by the computer back to the user based on a list of known telephone numbers in a password-log file. There are substantial difficulties associated with this technique. First, if the terminals are directly attached to the computer rather than through a communications line, such a technique cannot be used. Second, most users of dial-up-type terminals generally use such terminals to provide location flexibility during use. Such flexibility would be greatly limited and would only be available to telephone numbers listed in the access log file. Even if the log file includes a list of four or five telephone numbers for each user, the user's flexibility in using the dial-up terminal is greatly limited.

Other security systems have been developed in the past which monitor operating statements and commands made to the central processing unit (CPU) of the computer. One such system is described in U.S. Pat. No. 3,931,504 to Jacoby which issued on Jan. 6, 1976. The device described in the Jacoby patent monitors the operating statements communciated to a CPU of a computer and compares the monitored information with predetermined standards. If the monitored information contains a character string which is identical to a predetermined standard, a counteraction is initiated which includes an alarm and a descriptive printout at a remote location indicating the source and severity of any security violation.

SUMMARY OF THE INVENTION

It is an object of the subject invention to provide a security system for computers which creates individual accountability by each user.

It is another object of the subject invention to create a security system which is a tamper-proof means of monitoring a user's actions in a computer system.

It is another object of the subject invention to provide a security system for gaining access to a computer through an individual-accountability, user-authentication, tamper-proof device.

It is a further object of the subject invention to provide a security protection device for a computer which can be remote from both a user's terminal and the actual computer to be protected and which is "transparent" to both the user and to the computer.

It is another object of the subject invention to provide a device which performs communications functions to allow multiple user terminals to communicate with a single security device to allow the security device to act as a terminal concentrator or front end for a host computer.

It is another object of the subject invention to provide a security device which provides multilevel access control for each particular user to various computers, operating systems, or function programs available in a computer system, whereby the security device automatically connects the user to the particular computer, operating system, or function program to which the user desires access.

It is another object of the subject invention to provide a security device capable of command filtering, data capture, and recording to produce a searchable audit trail of potentially sensitive uses of a computer systems.

It is yet another object of the subject invention to provide a security device capable of encrypting data prior to transmittal over a communications line.

The invention can be briefly described as a protector device for enhancing the security of a computer system which includes one or more user terminals and one or more host computers. The protector device includes a detection means for monitoring communications between terminals and host computers wherein the detection means is independent from the host computer and the terminals. The detection means is connected to the computers and the terminals such that information transmitted between the computers and the terminals is transmitted through the detection means. The detection means icludes user authentication means for checking the identification of users of the terminals through an authentication procedure. Such authentication procedures are generally referred to as password-type procedures where the password is provided by one or more means such as keybord inputs, physiological scanners, physical keys, or other means capable, singly or in combination, of providing a unique data stream which can be used to uniquely identify an individual. The detection means also includes access-level means for limiting identified users to predetermined access to certain computers, operating systems, data bases, and function programs. The detection means further includes a command-filter means for monitoring information transferred between the computers and the terminals and generating an audit capture command in the event that certain predetermined potentially sensitive information is transmitted in either direction between the computer and the terminals. The detection means still further includes audit recording means for recording a predetermined data segment corresponding to each type of potentially sensitive information which exists each time an audit capture signal is generated. In the preferred embodiment, the detection means includes an audit trail means for storing data segments recorded by the audit recording means when the audit capture signal is generated. Also included in the detection means is a means to block the transfer of certain data identified by the command filter so that such identified data is not transferred from terminal to computer or computer to terminal. The detection means may also have a means to modify certain data identified by the command filter so that unmodified data is blocked and only modified data is transferred from terminal to computer or from computer to terminal. In addition, the detection means may also have a cryptographic means for encrypting information transmitted between various terminals and computers in a computer system network.

DETAILED DESCRIPTION OF THE PREFERRED EMBODIMENTS

Figure 1:
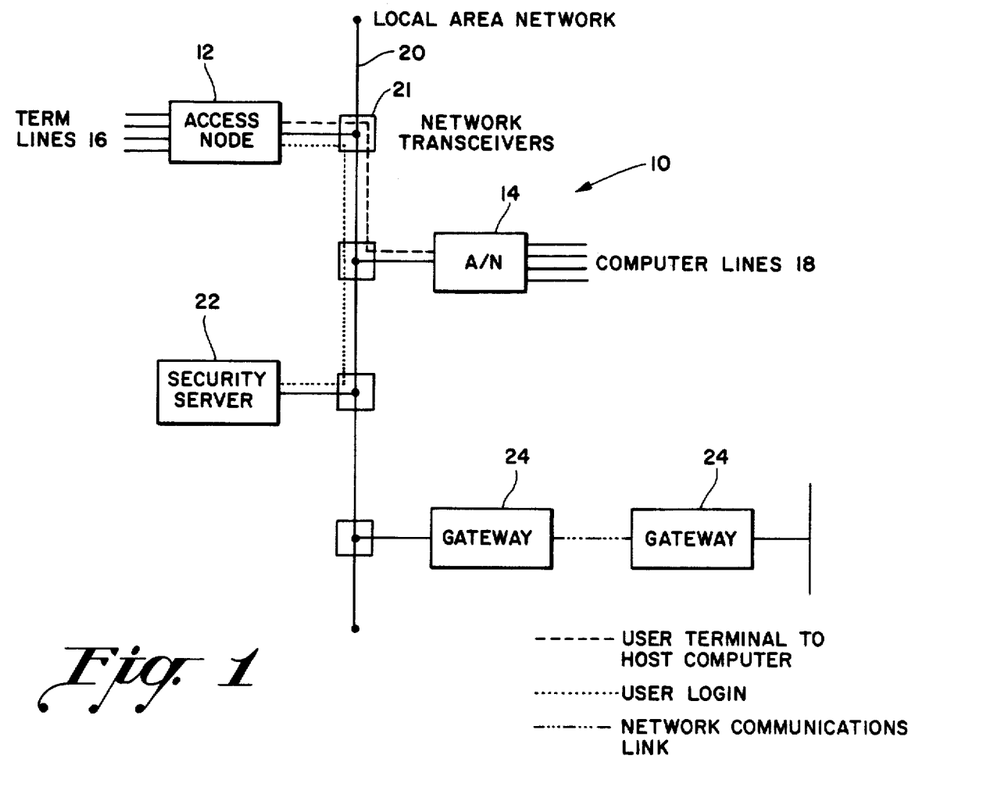
FIG. 1 is a schematic diagram of one embodiment of the subject invention as used in a local area network-type system.

Refer now to FIG. 1 which is a block diagram illustrating one embodiment of the subject invention. In FIG. 1, a protector system 10 may include a plurality of access nodes 12, 14. Each access mode may be connected to a plurality of terminals 16 or computers 18 or any combination of terminals and computers. The access nodes are connected to one another by a local area network (LAN) such as on an Ethernet line 20 developed by Xerox Corporation through Ethernet transceivers 21. An Ethernet line is a specially designed type of communications line having certain specifications well known to those skilled in the art and described in Version 2.0 of the Joint DIGITAL, Intel, Xerox Ethernet Specification published November, 1982. Ethernet lines are used for data transmission.

Also connected to the Ethernet link 20 is a security server 22 which performs several functions. First, it includes a detection means or security for monitoring communications between the terminals 16 and the computers 18. In this application, the terms "detection means" and "security server means" are used interchangeably. It should be noted that the security server is independent from the host computer and terminals, but connected to the computers and terminals such that information transmitted between the computers and terminals can also be transmitted through the security server.

The security server also includes means for checking the identification of users of the terminals through a password-type procedure. In addition, in one embodiment the security server provides an access-level means for limiting identified users to predetermined access to certain computer ports. A computer port is an electronic line between a user's terminal 16 and a partitioned segment of a plurality of host computers. Depending on the purpose of a particular embodiment of the security server's access level means, the ports may define separate host computers, portions of a host computer such as an operating system or a plurality of host computers. In other embodiments the security server can be used to connect the user through a gateway 24 which can be considered as a special-purpose access node which connectes the user to host computers on other local area networks (LANs).

The security server also provides a transfer means for automatically transferring the identified user to a single-current-access choice or port based on input from the user.

The security server also provides a command-filter means for monitoring information transferred between the computers 18 and the terminals 16 to generate an audit-capture command in the event that certain predetermined potentially senstivie information is transmitted between the computers and the terminals. An audit recording means is also provided in the security server that records a predetermined data segment corresponding to each type of potentially sensitive information existing when an audit signal is generated.

The security server also includes an audittrail means, as well as a cryptographic means and an alarm generating means. Each of these features will be discussed in greater depth below.

Figure 2:
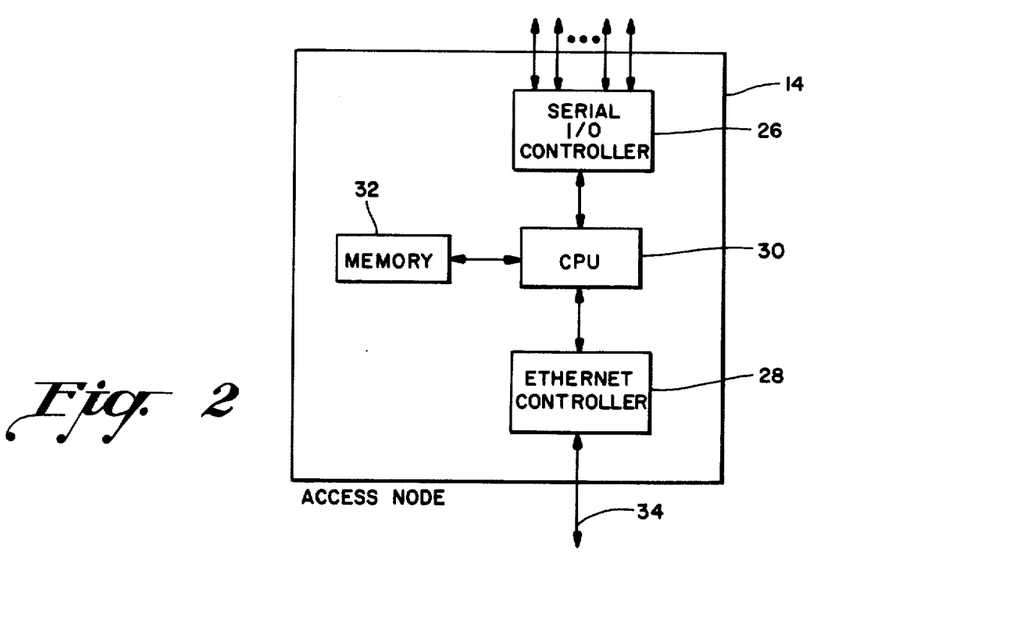
FIG. 2 is a schematic diagram of an access node.

Refer now to FIG. 2 which is a block diagram of a typical access node 14 of FIG. 1. As can be seen in FIG. 2, each access node 14 typically consists of a serial in/-out controller 26. The controller 26 receives and transmits asynchronous signals from a plurality of user terminals 16 of FIG. 1 and causes the actual physical connects and disconnects to occur between the terminals and the access node. In one embodiment of the controller 26, it may be desirable to use an Integrated Solutions Inc. serial I/O controller number ISDH-16 which includes 16 programmble serial ports, breakout panels, and cables. The access node 14 further includes a local-area-network controller such as an Ethernet controller 28 which receives and transmits Ethernet link-layer protocol to the Ethernet links. The Ethernet controller serves to form the physical connection required between the terminals and host computers as well as provide common LAN protocols such as transport and link-level protocols.

The access node 14 still further includes a central processing unit (CPU) 30. In one embodiment, the Ethernet controller 28 and the CPU 30 may be formed from an ENP-10 manufactured by Communications Machinery Corporation and described in the Ethernet Mode Processor User's Guide first edition, published February, 1984.

The CPU 30 may be a Motorola 68010 in one embodiment. The CPU may typically run a 128k memory 32 and execute program instructions stored in the memory. The functions performed in the CPU 30 through the memory program may typically include: multiplexing asynchronous signals from the plurality of terminals 16 into a single transceiver cable 34 to an Ethernet or other type of LAN transceiver 22 (FIG. 1).

Figure 3:
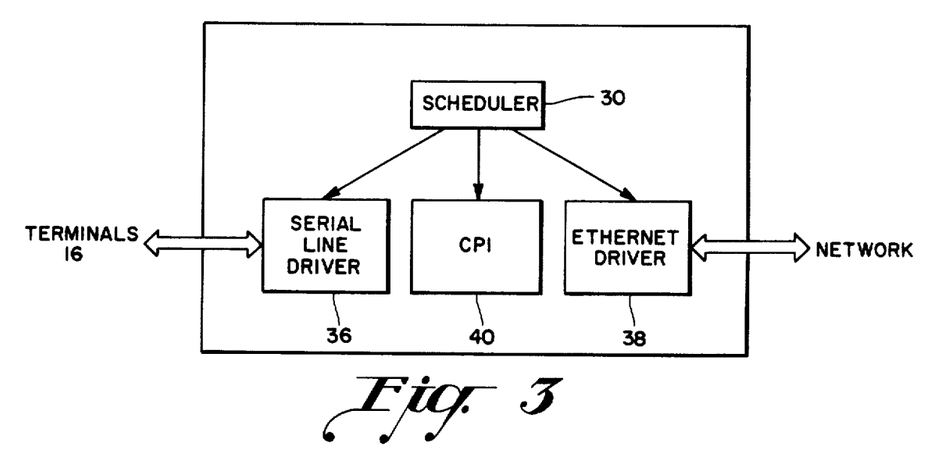
FIG. 3 is a more detailed schematic diagram of software modules for an access node.

In order to comprehend some of the functions the subject invention includes with respect to the access node CPU 30 it may be desirable to refer to FIG. 3 which is a functional diagram of the access-node software. As can be seen in FIG. 3, a serial-line driver 36 serves to receive and transmit signals to the terminals 16 while an Ethernet driver 38 serves to control signals received from, and transmitted to, the host computers via Ethernet lines.

The command protocol interpreter (CPI) 40 serves several functions. First and foremost, the CPI is responsible for maintaining and controlling connections between its serial lines and the serial lines on other access nodes, possibily on other networks, as well as to a security server. All connections made by the CPI are made in response to commands from the security server 22, FIG. 1, which will be discussed in greater detail below. When a connection is made between a terminal and a host computer, the access node associated with the terminal duplicates all data transmitted from the terminal to the host and sends the duplicate data to the security server.

The CPI can respond to instructions from the security server such as: make connections, break connections, set or change serial-line parameters such as the baud rate of each line, special character meaning, parity functions and other detailed parameters of asynchronous lines. The CPI can detect the occurrence of certain events such as when one of the serial lines from a user terminal is idle for a predetermined length of time (which would cause the access mode to notify the security server), or when a network connection is lost (which would also cause the security server to be notified). In addition the CPI will monitor the inputs from the user terminals to determine if a "secure attention" character is received. This feature will be discussed in greater detail below in conjunction with the security server. It is important to note at this point, however, that the CPI notes the event (the entry of the secure attention character) and causes the terminals to be immediately connected directly to the security server.

Figure 4:
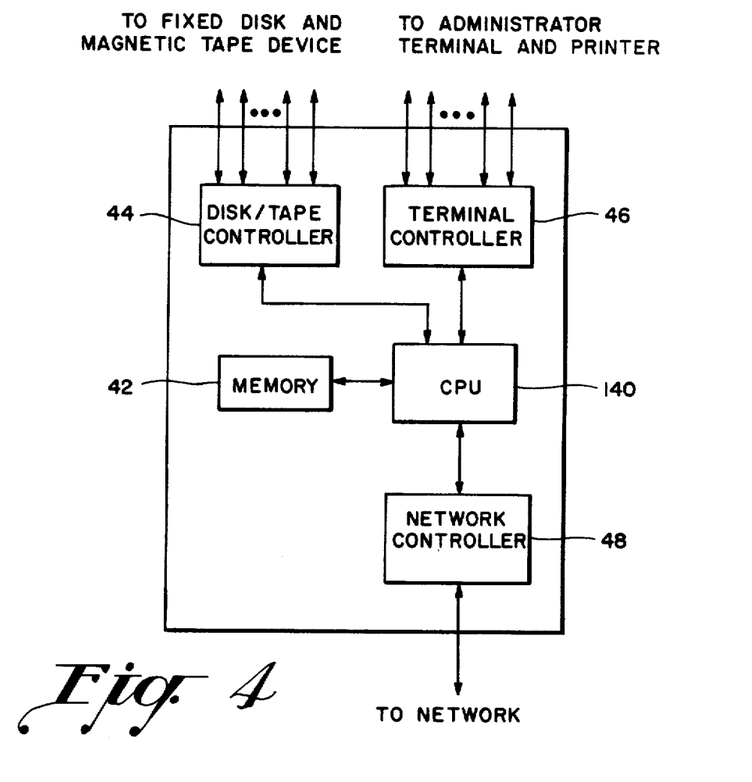
FIG. 4 is a schematic diagram of the hardware associated with a security server of the subject invention.

Refer to FIG. 4, which is a block diagram of the security server hardware. The security server 22 includes a CPU 140. The CPU performs several functions which will be discussed in greater detail below in conjunction with FIG. 5. The security server 22 also includes a main memory 42, which contains the security server program instructions and data. These instructions are executed by the CPU.

The security server hardware further includes a disk-/tape controller 44, which controls a fixed disk and magnetic-tape device. Very basically, the disk/tape controller causes potentially sensitive information to be transferred between the disk and main memory, the tape and main memory, or between the disk and the tape, the purpose of which will become apparent from the following discussion.

The security server hardware further includes a terminal controller 46 and an Ethernet controller 48. The functions of the terminal controller 46 and Ethernet controller 48 are generally similar to the functions outlined with respect to the serial I/O controller 26 and the Ethernet controller 28 of access node 14.

Each of the hardware components of the security server 22 is connected by a main bus 50, which transfers information from one component to another. In addition, the security server hardware may include private buses between various components, for example, between the CPU 140 and main memory 42.

Figure 5:
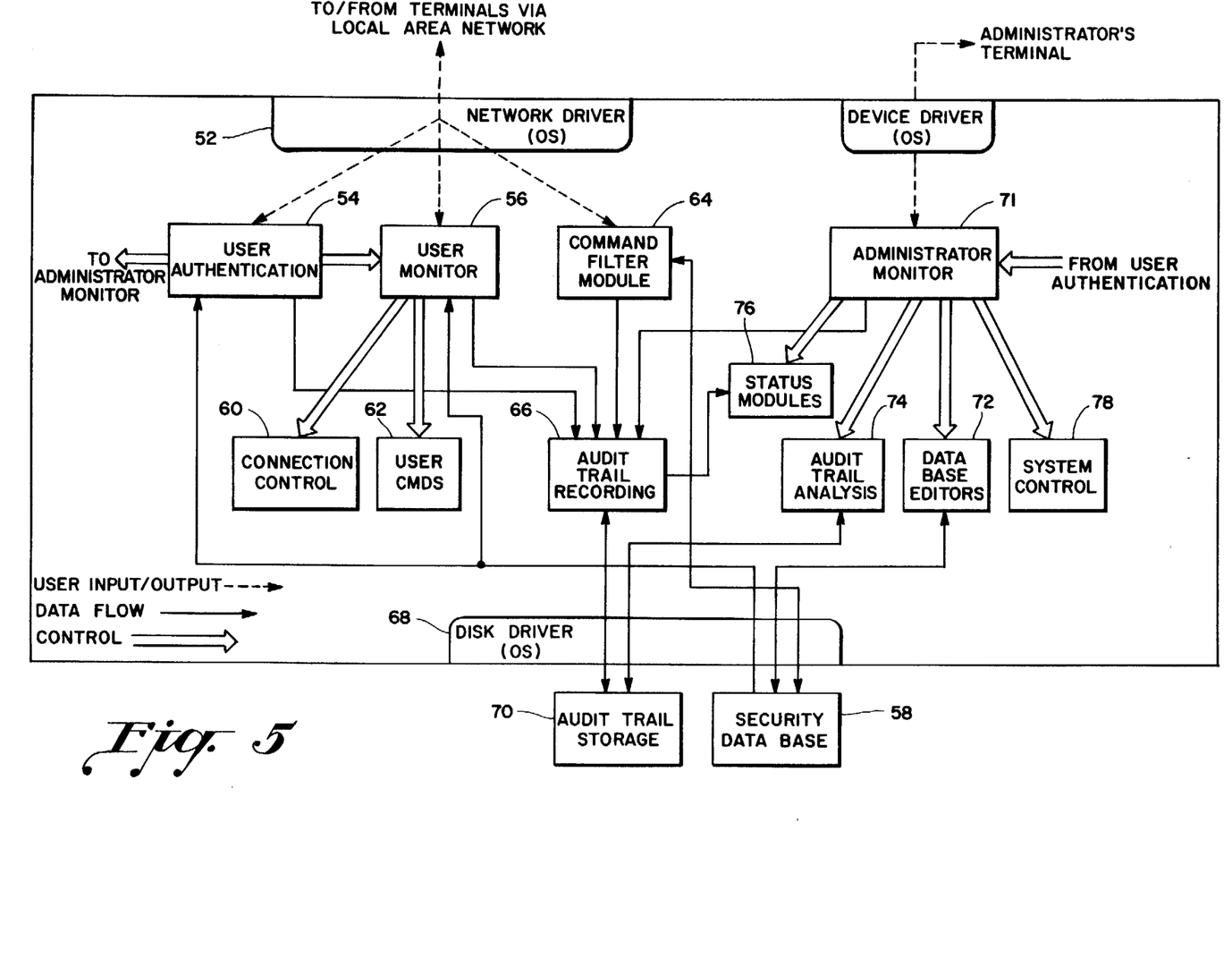
FIG. 5 is a more detailed diagram of information flow in a security server according to function.

Refer to FIG. 5, which is a block diagram of the basic software modules associated with the security server 22. The security server software 22 includes a network driver 52, which is a communication tool through which all information is received from and transmitted to user terminals. In the preferred embodiment, the network driver would typically be an Ethernet network driver. It should be noted that for other local-area networks, a driver appropriate to the network hardware would be used.

The security server software also includes a user-authentication module 54. The user-authentication module is active during the time that a user is gaining access to the system. Once the user has gained access to the system, the user authentication module transfers control to a user monitor 56. Both the user-authentication module 54 and monitor 56 rely on information contained in a security data base 58 to determine an appropriate response to a user's requests. The user monitor includes several submodules, each of which is discussed in greater detail below. The submodules include a connection-control module 60 and a user-commands module 62.

The security server also includes a command-filter module 64, which receives information directly from the network driver 52 to reflect all inputs from a user. The command filter generates an audit-capture command when certain predetermined potentially sensitive information is transmitted between a terminal and a host computer. When an audit-capture command occurs, information from the command-filter module is transmitted to an audit-trail recording module 66. As can be seen in FIG. 5, the audit-trail recording module 66 also receives information from the user-authentication module 54 and the user monitor 56. The audit-trail-recording module 66 consolidates information from the above sources and transmits the information through a disk driver 68 to an audit-trail-storage device 70. In one preferred embodiment, a command filter function may be performed in the access node 14. In this embodiment, the occurrence of an audit capture command will cause the access node to transfer audit information to the audit trail module 66 via communications media between the access node and security server. In this embodiment, the access node would be responsible for blocking or modifying certain information identified by the command filter. Such an event would cause the access node to transfer audit information to the audit-trail module 66 on the security server. The access node would not pass the identified information on to the intended recipient, either terminal or computer, in an unmodified form. The access node would completely block the transfer of the identified information, or in advanced systems, modify the identified information so that the modified information is harmless and can then be transferred to the intended recipient.

In addition to monitoring and controlling user activities, the security server also supports administrator activities, by means of an administrator monitor 71.

Administrator activities include reading and changing the security data base 58, analyzing the audit-trail storage 70, and monitoring current system status and controlling system activity. Accordingly, submodules of the administrator monitor 58 include a data base editor 72, an audit-trail-analysis module 74, a status module 76 and a system-control module 78. Access to the administrator module 71 is gained through the user authentication module 54 in a manner analogous to normal user authentication.

Figure 6:
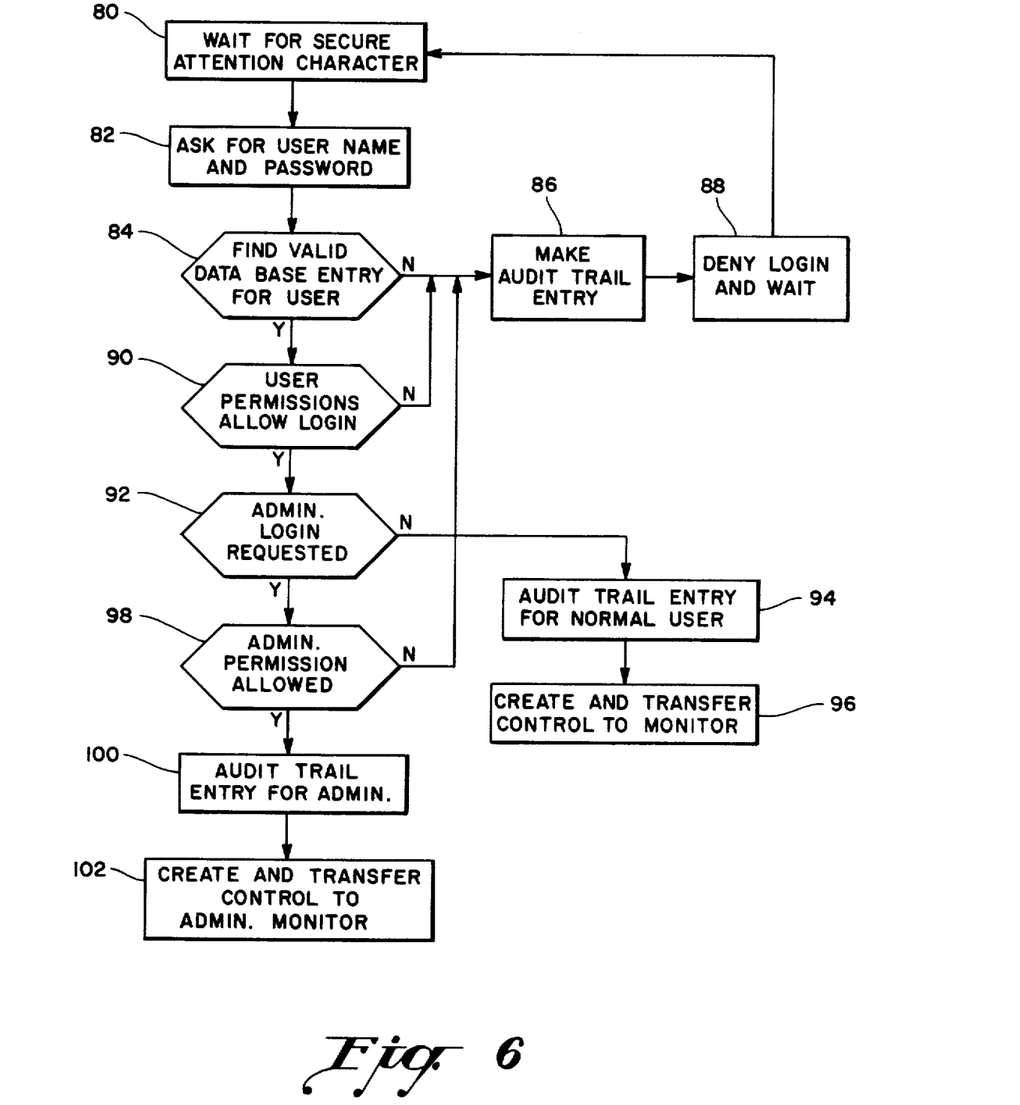
FIG. 6 is a flowchart for the user-authentication module illustrated in FIG. 5.

Refer to FIG. 6, which is a flowchart of the user authentication procedure performed by the user authentication module 54 of FIG. 5. The user authentication procedure is normally in an idle state, waiting for the arrival of a "secure attention" character from the user. The idle state is illustrated by block 80 in FIG. 6. After a "secure attention" character has been received, the user-authentication module asks the user for a login name and password, illustrated by block 82. The user then provides a login name and password and the user authentication module then consults the security-data base 58 to find an entry for the given login name. If there is no entry for the given login name, or if the password is incorrect, then the user-authentication module responds by sending a message to the audit-trail-recording module 66, which documents the unsuccesful login attempt. This is illustrated by block 86. The user authentication module then denies access to the individual and forces a delay before another login attempt can be made. This is illustrated by block 88.

If the login name and password are accepted, the user authentication module then consults the security data base 58 to check that all other access requirements are fulfilled. Typical access requirements include permission to gain access through a particular terminal and permission to gain access at a particular time. These checks are illustrated by block 90. If the access requirements are not fulfilled, access is denied and the user authentication module takes the actions described above with respect to blocks 86 and 88. If these access requirements are fulfilled, the user authentication module determines whether the individual desires to be a user or an administrator. This is illustrated by block 92. If the individual desires to be a user, the user authentication module responds by sending a message to the audit trail recording module 66 of FIG. 5, to signify that a user has successfully logged in to the system. This is illustrated by block 94 of FIG. 6. After a user has been successfully logged in, the user-authentication module further responds by activating a user monitor 56 (FIG. 5) unique to that user. This is illustrated by block 96 of FIG. 6.

In the event that the login name indicates that the individual wishes to do so as an administrator, the user authentication module consults the security data base 58 to check that the individual has permission to be an administrator. This is illustrated by block 98. If the security data base indicates that the individual is not allowed to be an administrator, a message is sent to the audit-trail-recording module 66 (FIG. 5) and access is denied in a manner analogous to that described above with respect to block 86 and 88. If administrative permission is allowed, the user-authentication module responds by sending a message to the audit-trail-recording module 66 (FIG. 5) to record that an administrator has successfully logged on. After an individual has been successfully logged in as an administrator, the user authentication module further responds by activating an administrator monitor 71 (FIG. 5) unique to that administrator. This is illustrated by block 102 of FIG. 6.

In one embodiment of the subject invention the user-authentication module 54 further includes a mechanism which detects repeated unsuccessful login attempts. When this oocurs, a message is sent to the audit-trail-recording module 66 (FIG. 5), and further login attempts from that terminal may be ignored. Another feature in one embodiment of the subject invention may be to cause the individual to be automatically logged off if the individual remains logged in outside of his allowed hours.

Figure 7:
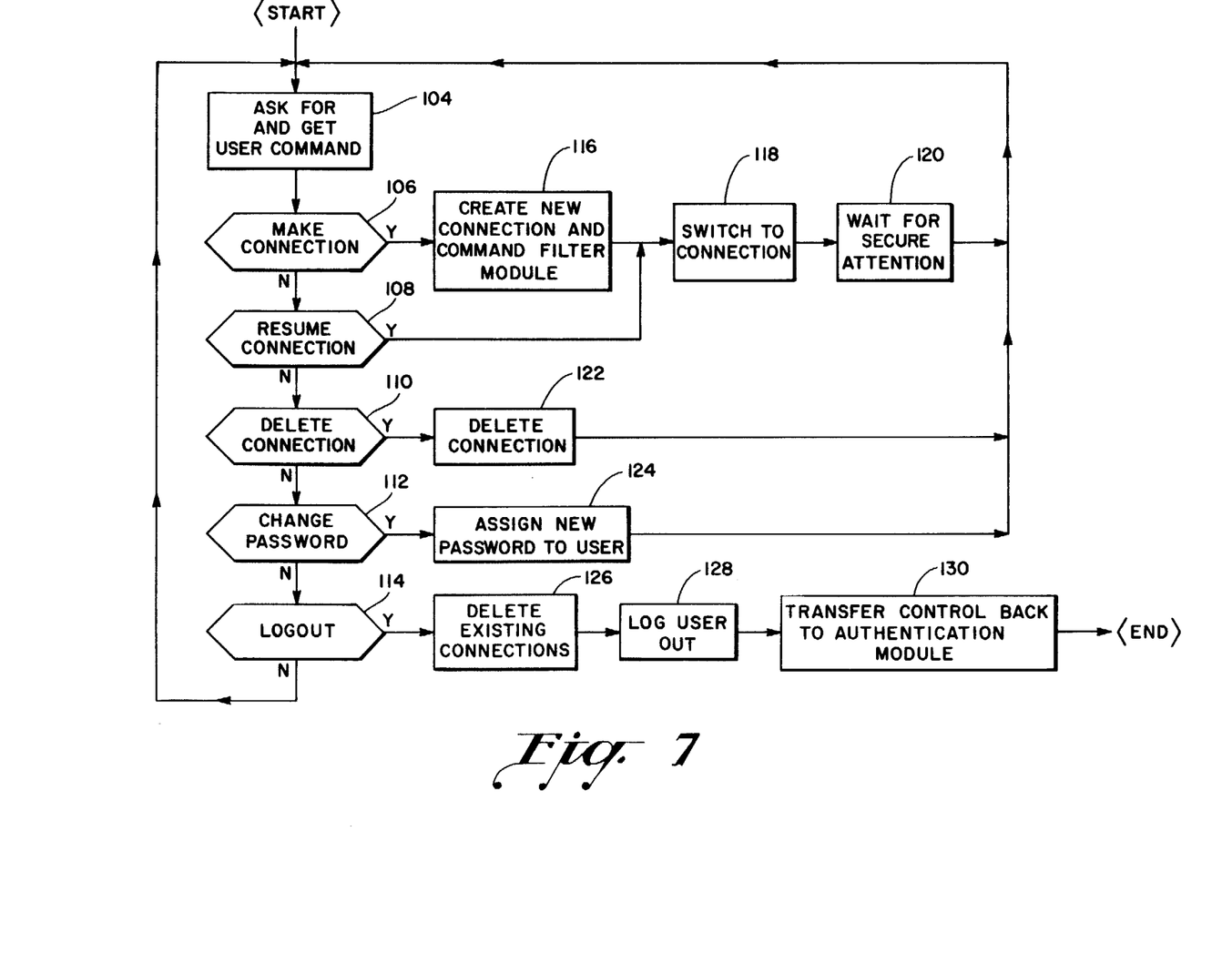
FIG. 7 is a flowchart for the information flow for the user monitor illustrated in FIG. 5.

Refer now to FIG. 7, which is a flowchart for the user monitor 56 functions. After the user authentication module 54 creates the user monitor 56 all input from and output to the user terminal is received and sent by the user monitor 56. The user monitor 56 first presents a list of services which are available to that particular user based on information within the security data base 58. This process is illutrated by block 104 in FIG. 7. Possible alternative services available to the user include making a connection 106, resuming a connection 108, deleting a connection 110, changing a password 112, or logging out 114. It should be recognized that other alternative services could be provided, depending on a particular application. In the particular embodiment illustrated in FIG. 7, the user monitor first checks to see if the user wishes to make a connection, illustrated by block 106. If the user desires to make a connection, the user monitor responds by creating a new connection and generating a command filter module 64 unique to that particular user for that particular connection based on information contained in the security data base 58 of FIG. 5. The process of creating a new connection and command filter module is illustrated by block 116 of FIG. 7. At this point in time, the connection is created but is not in use. The connection is actually implemented as a separate stage, which is illustrated by block 118 of FIG. 7. Once the connection is implemented, information traveling between the terminal and the host computer is duplicated, and the duplicate signal is transmitted through the command filter module 64 of FIG. 5. The connection remains implemented until a "secure-attention character" is received from the user. A "secure-attention character" is simply a special character which has been previously designated to cause the security server to revert to a known state, considered to be secure. For example, when the user is in a mode in which information currently is being directed through the command filter module, the use of a secure-attention character will cause the user to be reverted back to the list of services illustrated by block 104. The key feature of the secure-attention character is that it causes the user to be placed in a known secure state. Thus, in this embodiment, when a secure attention character is received, the connection is suspended; further input from the user is diverted back to the user monitor 56, which is illustrated by block 120 of FIG. 7 and the user is presented with the list of services from which he may choose his next action. It is important to note at this point that the previously used connection and command filter module 64 are still in existence, they are simply not in use.

In some instances it may be desirable to create more than one connection at a time, although a user will generally be limited to using only one connection at a time in most embodiments. This may be desirable in instances where a user may be switching back and forth from one connection to another during a single login session. In the event that a user wishes to resume a previously suspended connection, he chooses a "resume-connection command" from the list of available services. This action is illustrated by block 108 of FIG. 7. The resume-connection command causes the connection to be physically resumed as illustrated by block 118.

Another possible alternative available to a user in the preferred embodiment is the "delete-connection command," illustrated by block 110 and 122 of FIG. 7. This command causes the physical connection and the command filter module 64 to be deleted once all data has been received. This alternative is available in the preferred embodiment as a practical matter, because only a limited number of connections will be available to each user.

Another alternative service available to a user in the preferred embodiment is the "change password" service, illustrated by block 112 and 124. The change password service is simply a service to allow the user to be assigned a new password. In the preferred embodiment, the user is not allowed to choose his own password, but is assigned a password by the security server. In one embodiment, the security server generates a word at random, having a particular length, that is not currently in use as a password. In the preferred embodiment, the random generation process is designed to generate passwords that are relatively easy for the user to remember. Also in the preferred embodiment, the user is allowed to refuse a given password and request another. Another feature that may be preferable is to allow a password to remain valid only for a predetermined period of time, after which the user must request a new password.

A final alternative service available to the user through the user monitor is the logout command, illustrated by blocks 114, 126, 128 and 130. When the user selects the logout command, the user monitor 56 responds by deleting any existing connections and logs the user out. When the user is logged out, the user monitor disappears and a user authentication module 54 takes its place, in preparation for another user login.

It should be noted that for almost all of the events illustrated by the blocks in FIG. 7, generated messages are sent to the audit-trail recording module 66 in FIG. 6 for storage in the audit-trail storage 70. In addition to the events discussed above, many activities that the user engages in while a specific connection is made are recorded by the audit-trail recording module 66 from information received by the command-filter module 64. The command-filter monitors information transferred between the terminal and the computer and generates an audit-capture command in the event that certain predetermined potentially sensitive information is transmitted. Whenever an audit-capture command is generated, the audit-trail recording means creates a record summary of key information transmitted between the user terminal and the host computer for storage by the audit-trail-storage module 70. The key-information summary typically includes a predetermined data segment having characteristics dependent on the particular type of information being monitored.

Figure 8:
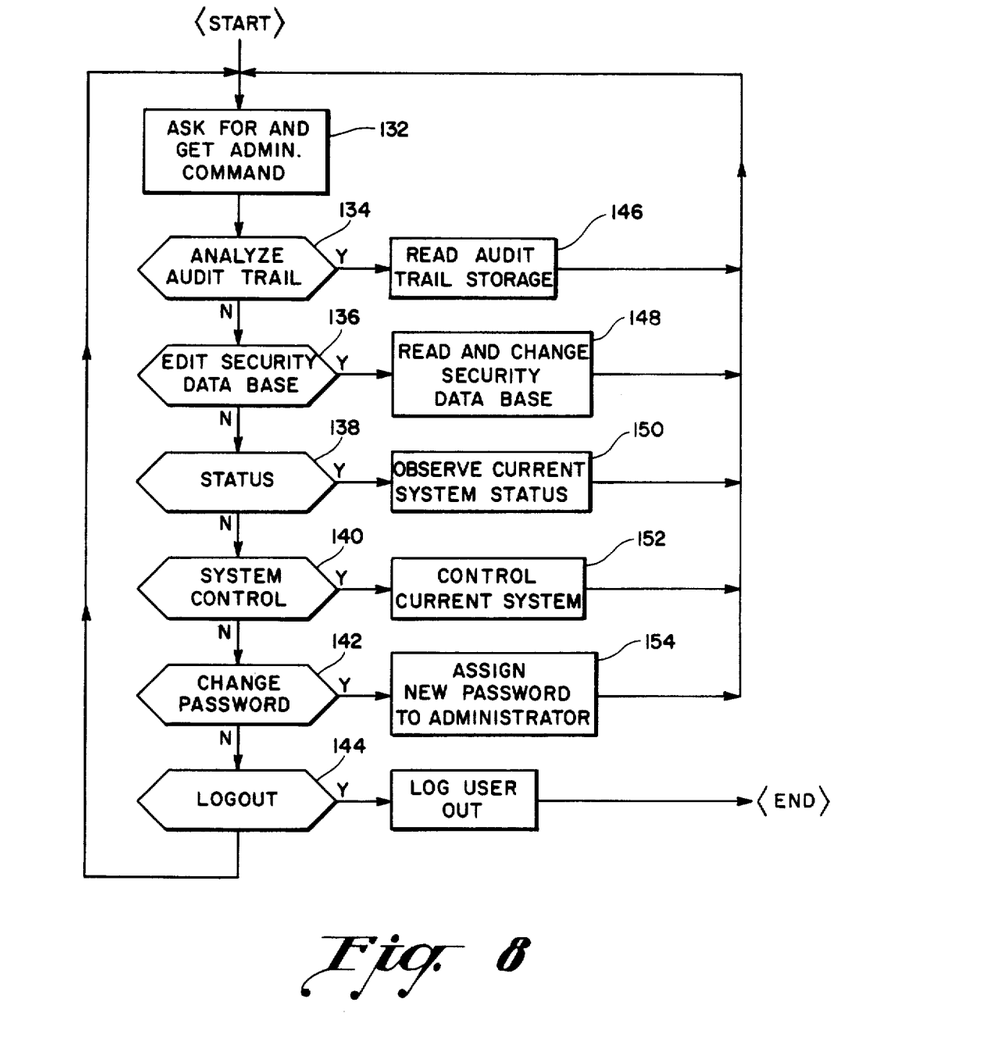
FIG. 8 is a flowchart illustrating the administrator module illustrated in FIG. 5.

Refer now to FIG. 8, which is a flowchart for the administrator monitor 71 functions. After the user-authentication module 54 creates the administrator monitor 71, all input from the output to the user terminal is received and sent by the administrator monitor 71. The administrator monitor 71 first presents a list of services which are available to that particular administrator based on information within the security data base 58. This process is illustrated by block 132 in FIG. 8. Possible alternative services available to the administrator include analyzing the audit trail 134, editing the security data base 136, checking system status 138, exercising control over the system 140, changing his password 142, and logging out 144. It should be recognized that other alternative services could be provided, depending on a particular application. In the particular embodiment illustrated in FIG. 8, the administrator monitor first checks to see if the administrator wishes to analyze an audit trail, illustrated by blocks 134 and 146 of FIG. 8. It will be recalled that the audit-trail storage 70 retains a record summary of key information relating to potentially sensitive events. When the administrator gives the command to analyze the audit trail, the audit trail analysis module 74 is activated to retrieve information from audit-trail storage 70. The administrator may view the information in the audit trail storage module 70 in a variety of ways. For example, the administrator may view the contents of module 70 in the order in which they were placed in the storage. He may also selectively view certain types of events, such as all user logins, user logins from a specific location, logins by a specific user, the creation and deletion of connections, as well as potentially sensitive events as recorded through the command filter module 64. The exact nature of these potentially sensitive events is dependent on the particular installation. For example, the transfer of a large sum of money from one account to another could be deemed potentially sensitive in a banking installation. Another example would be a search of a particular person's credit record in a credit reference installation. In a defense environment, a potentially sensitive event noted by the command filter module might be the inspection of files containing classified information.

After a particular audit trail analysis has been completed, the administrator monitor 71 automatically causes the administrator to be returned to the list of services available illustrated by block 132.

If the administrator chooses to edit the security data base, the administrator monitor 71 causes the data base editor module 72 to be activated. In this mode the administrator can view the security data base and perform a variety of operations on it. For example, the administrator can add or delete login names, specify or change the specific events which the command filter module 64 identifies as potentially sensitive events, and specify or change the connections allowed for each user. Another example of a change is generating a new password for an individual.

Another command selection that the adminstrator typically has available is the "status" command. The status command operation is illustrated by blocks 138 and 150 of FIG. 8. When the administrator invokes the status command, the status module 76 of FIG. 5 is activated to allow the administrator to observe current system status. This means that the administrator can see who is currently logged in at what locations and what connections currently exist. He can also view the security events as they are reported to the audit trail recording module 66. In the preferred embodiment the administrator may also see the current status of the operating system, including a measure of network traffic and storage space availability.

Another type of command selection that the administrator typically has available includes system control commands. System-control commands are exemplified by the ability to force a user off the system, shut the system down, and send messages to all users on the system. in addition, a system-control command typically includes the ability to change the baud rate or other characteristic of a terminal. The system-control command functions are illustrated by boxes 140 and 152 of FIG. 8. The commands are carried out by the system control module 78 (FIG. 5).

Another typical command selection that an administrator has in the preferred embodiment is to change his own password. This is illustrated by blocks 142 and 154 in FIG. 8. The operations involved in changing the administrator's password are essentially identical to those involved in changing a user's password as discussed above. In the preferred embodiment the administrator's password is typically valid for a shorter period of time than a user's password. This it to increase the security of the system.

And finally, another typical command selection that an administrator has is the ability to log out. The logout process is esentially identical to normal user logout, except that an administrator cannot have connections. This is a very important point to note. The subject invention comprehends that an administrator's access to the system is functionally separate from a user's access. The administrator's access to the system is limited to those functions which are necessary to monitor and maintain the security data base 58 and the audit trail storage 70. The administrator cannot make connections to host computers. The user, on the other hand, can make connections to host computers in accordance with information contained in the security data base 58 but does not have access to any administrator functions.

In some embodiments, it is desirable to have an audit trail recording system for the administrator as well as for the user. This would create a record of potentially sensitive actions taken by the administrator. These include changes to the security-data base, creaton or deletion of users, and invocation of the audit trail analysis module 74.

Thus it can be seen that the subject invention includes several key features. One key feature is separate controlled access by administrators and normal users. Along this vein, access to host computers can only be gained by first logging in through the user authentication module, which causes a user monitor to be activated. Even then, access to a host computer is only granted in accordance with information stored in the security data base 58. In fact, the user is presented with a "menu" which shows only those host computers, operating systems or data bases to which he is allowed access. This concept of constantly controlling the user's ability to switch from one connection to another is a basic feature of the subject invention.

Similarly, another key feature of the subject invention is that the administrator is limited to certain actions, and the actions available to the administrator are for the most part distinct from the actions available to a user.

Another key feature of the subject invention is that it can be installed without modifying application software, system software or hardware interfaces. Once installed and properly managed, the subject invention transforms a data communications network into a secure network that can monitor and record access to any attached computing system. The subject invention adds six basic security features to an existing network: encryption, user authentication, access control, command filtering, an audit trail, and audit trail analysis. It should be noted that the information contained in the audit trail storage module 70 is essentially tamper proof. This creates individual accountability for each user's actions, which is very important in preventing computer abuse.

It should also be noted that information transferred between terminals and hosts may be encrypted before transmittal over a network by appropriate hardware or software to provide additional security.

The embodiments previously described implemented the features of the subject invention on multiple processors interconnected via an Ethernet. It should also be noted that other embodients could implement any or all features of the subject invention on a single processor or on multiple processors interconnected via any appropriate processor to processor communication means. In a multiprocessor embodiment, the particular choice of processor types and communication means and the choice of precisely where each feaure of the subject invention is to be implemented is subject to the cost and performance trade-offs dictated by the then available technology.

It should also be noted that the subject invention does not require that the user and the protected service be immediately connected to the protector. It is required that the protector is interposed between the user and the protected service. The original entry point of the user and all intervening connection means, including but not limited to intervening communications means and intervening computing means, may be collectivley considered the user "terminal." Similarly the phrase "computer" includes the collective means to connect the protector to the protected service.

Although the invention has been described and illustrated in detail, it is to be clearly understood that the same is by way of illustration and example only, and is not to be taken by way of limitation; the spirit and scope of this invention being limited only by the terms of appended claims.

I claim:

1. A protector device for enhancing the security of a terminal computer system, the terminal computer system including at least one user terminal and at lest one computer, the protector device being external to the terminal computer system and comprising:

data transmission means;

at least one access node adapted to be coupled to the computer and adapted to be coupled to the terminal such that data to be transferred from the terminal to the computer and from the computer to the terminal is transmitted through the access node;

wherein the acces node includes an in/out controller to be coupled to the terminal for controlling connects and disconnects between the terminal and the access node, a network controller coupled to the data transmission means for controlling connects and disconnects between the terminal and the computer, a memory, and an access node processor coupled to the in/out controller, the network controller and the memory, for controlling the in/out controller and the network controller, for transferring data to and from the memory and for executing program instructions stored in the memory in response to commands from a security server; and a security server including a server network controller coupled to the data transmission means for connecting and disconnecting the security server to the access node, a server memory, and a server processor coupled to the server network controller and the server memory for monitoring data from the access node, for controlling the server network controller, for transferring data to and from the server memory and for executing program instructions stored in the server memory;

wherein the server processor includes command filter means for comparing the monitored data with predetermined sensitive data stored in the server memory and for generating a blocking command when the command filter means indicates that the monitored data may not be transferred;

wherein the access node processor blocks transfer of the predetermined sensitive data in response to the blocking command.

2. The protector device of claim 1 wherein the command filter means further compares the monitored data with predetermined modifiable data stored in the server memory and generates a modify command when the command filter means indicates that the monitored data is to be modified; and wherein the access node processor modifies the predetermined modifiable data in response to the modify command.

3. The protector device of claim 1 wherein the access node processor includes means for duplicating data to be transferred from the terminal to the computer and from the computer to the terminal and for storing the duplicated data in the memory.

4. The protector device of claim 1 wherein the server processor includes user-authentication means for comparing the monitored data with predetermined user-identification data stored in the server memory and for generating an access command when the user-authentication means indicates that the monitored data represents a properly identified user; and wherein the access node network controller connects the terminal to the computer in response to the access command.

* * * * *